Feb. 5, 1929.

E. JONES 1,701,208

PIPE SLOTTING MACHINE

Filed Jan. 15, 1927

Inventor
Eli Jones.
By
Attorney

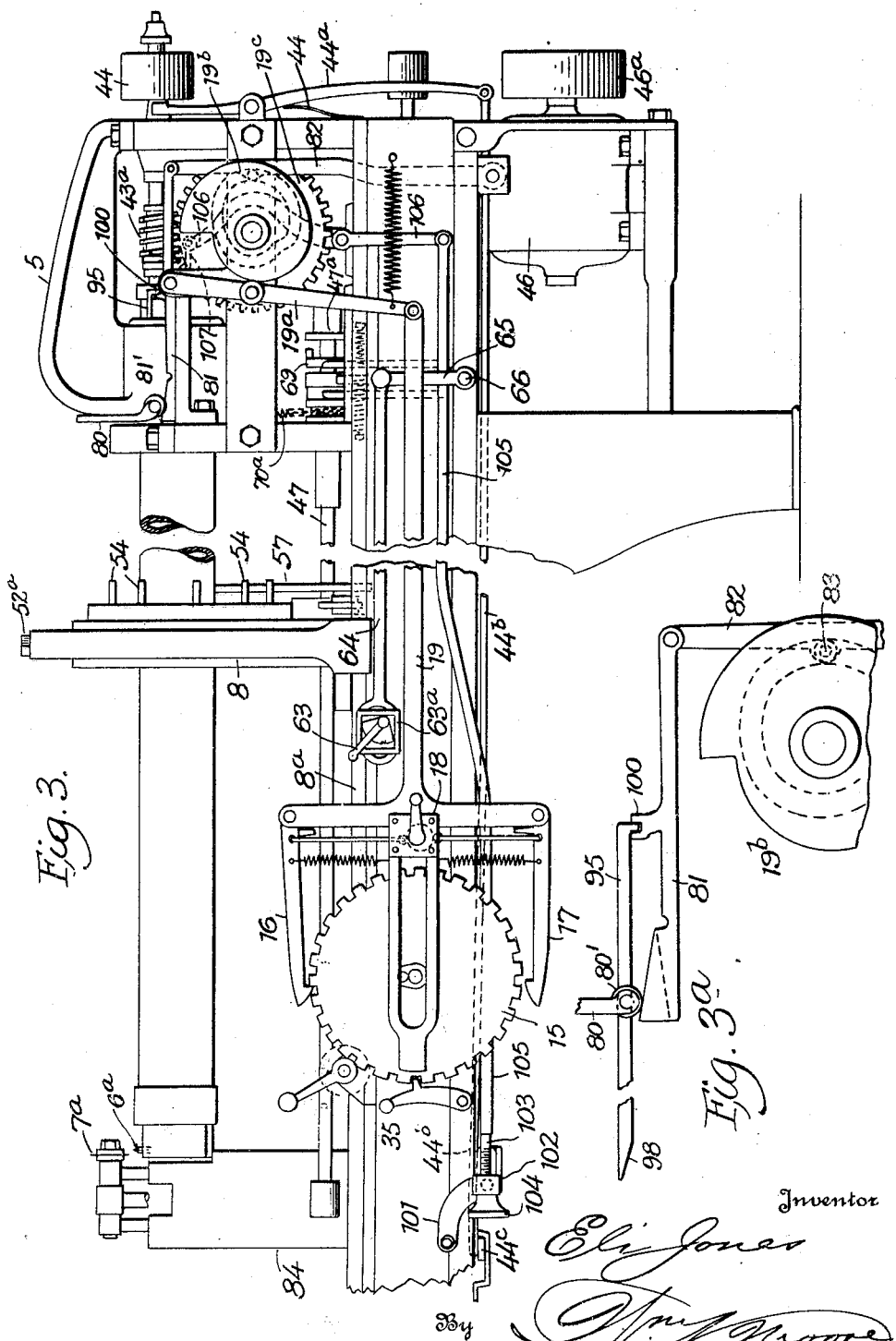

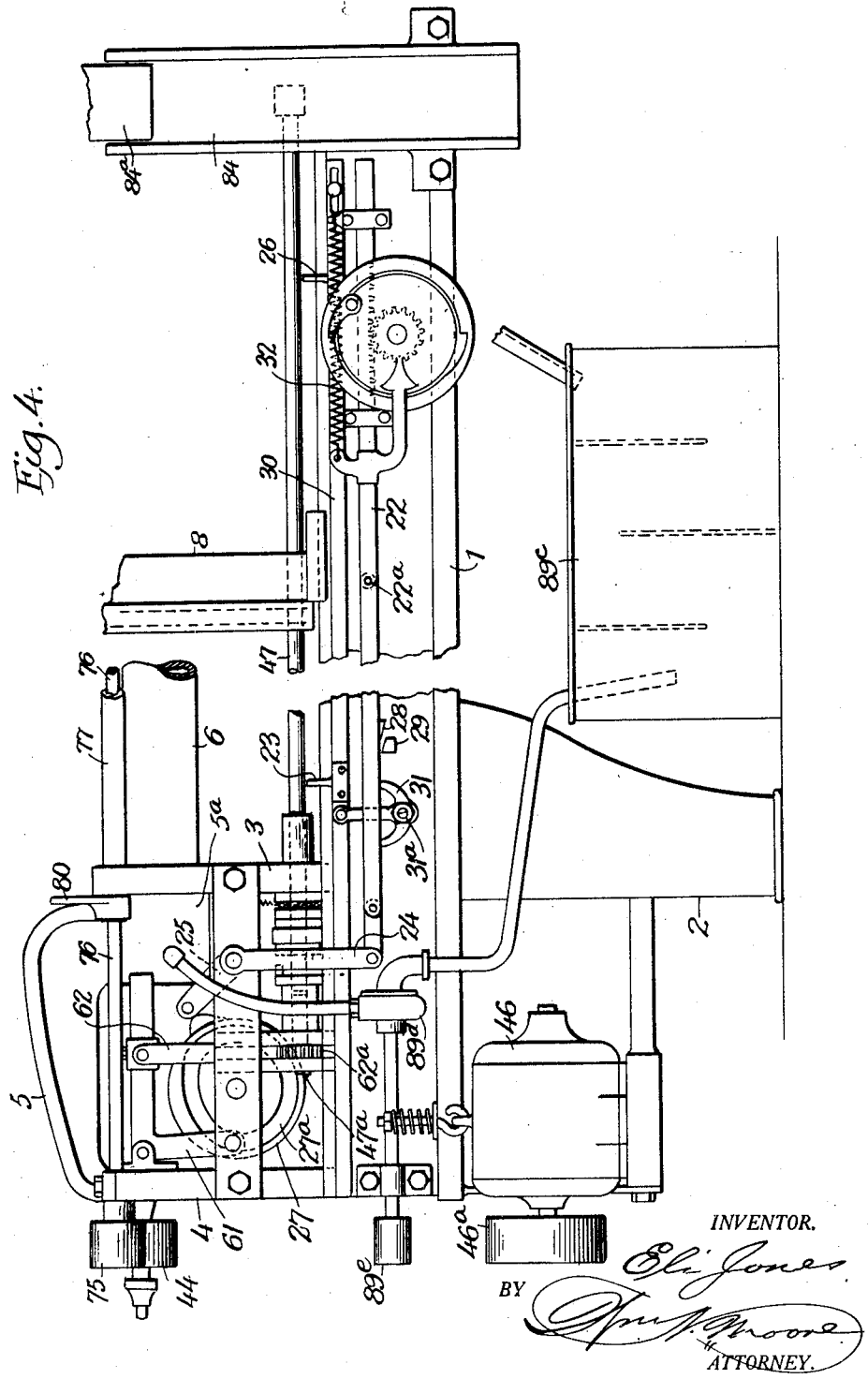

Feb. 5, 1929.
E. JONES
1,701,208
PIPE SLOTTING MACHINE
Filed Jan. 15, 1927
7 Sheets-Sheet 4
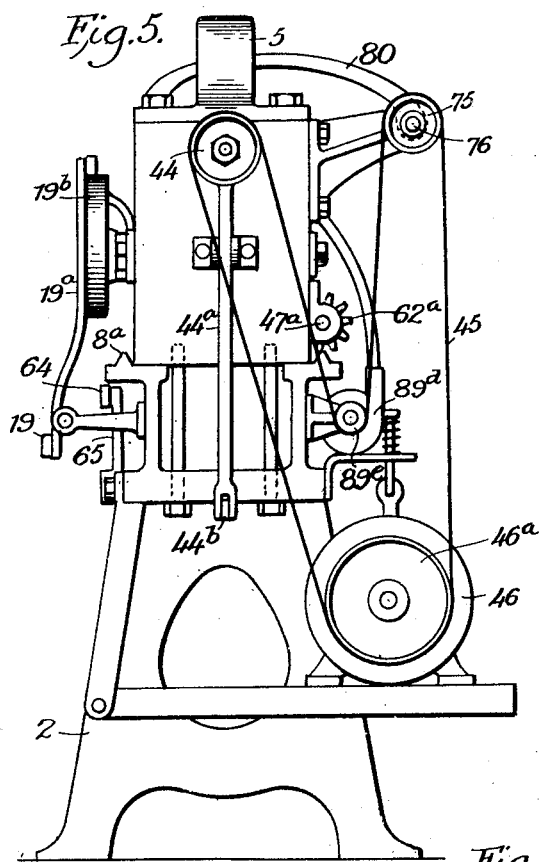
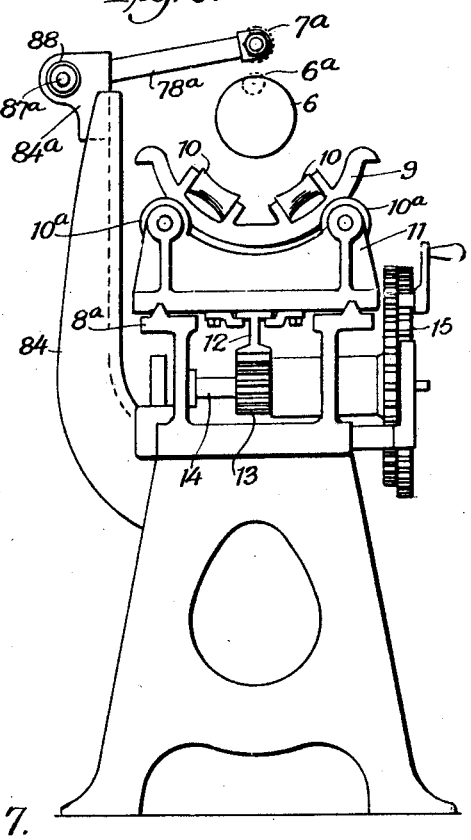
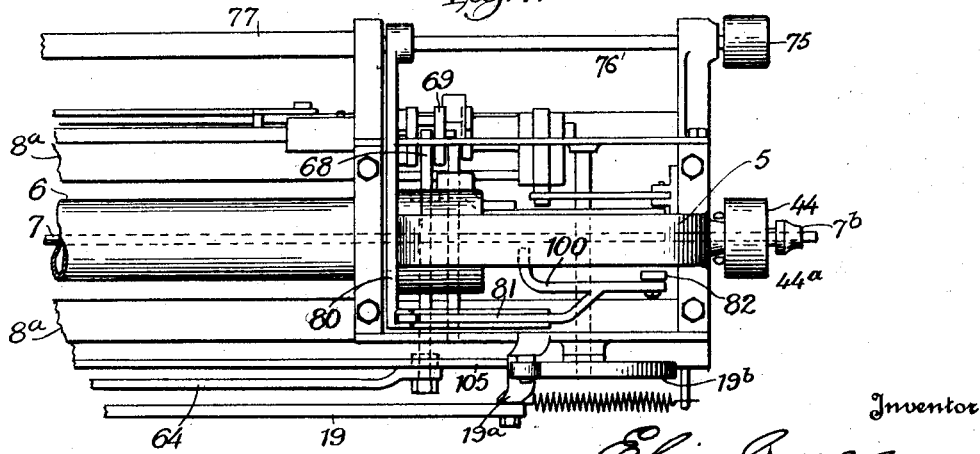

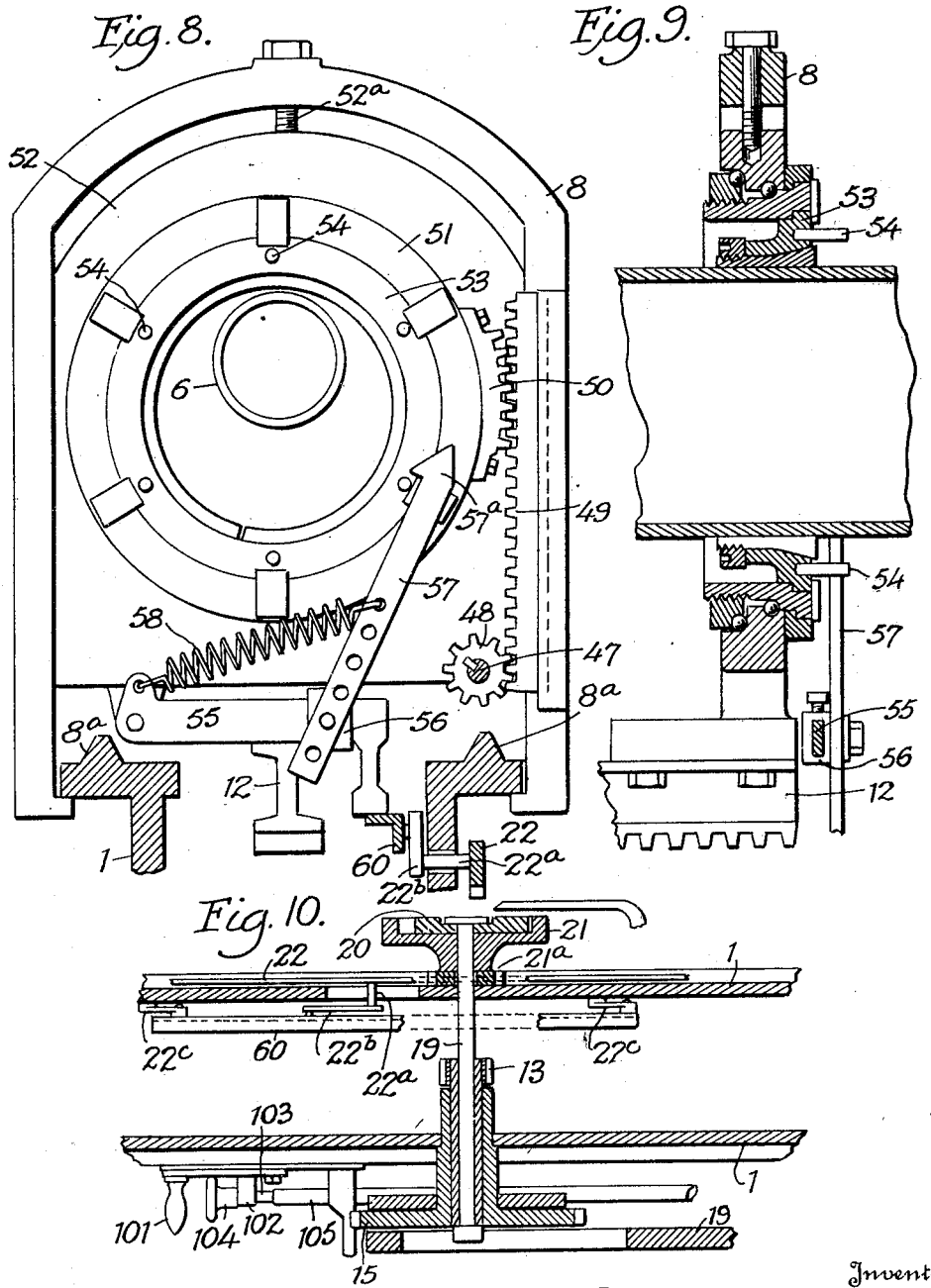

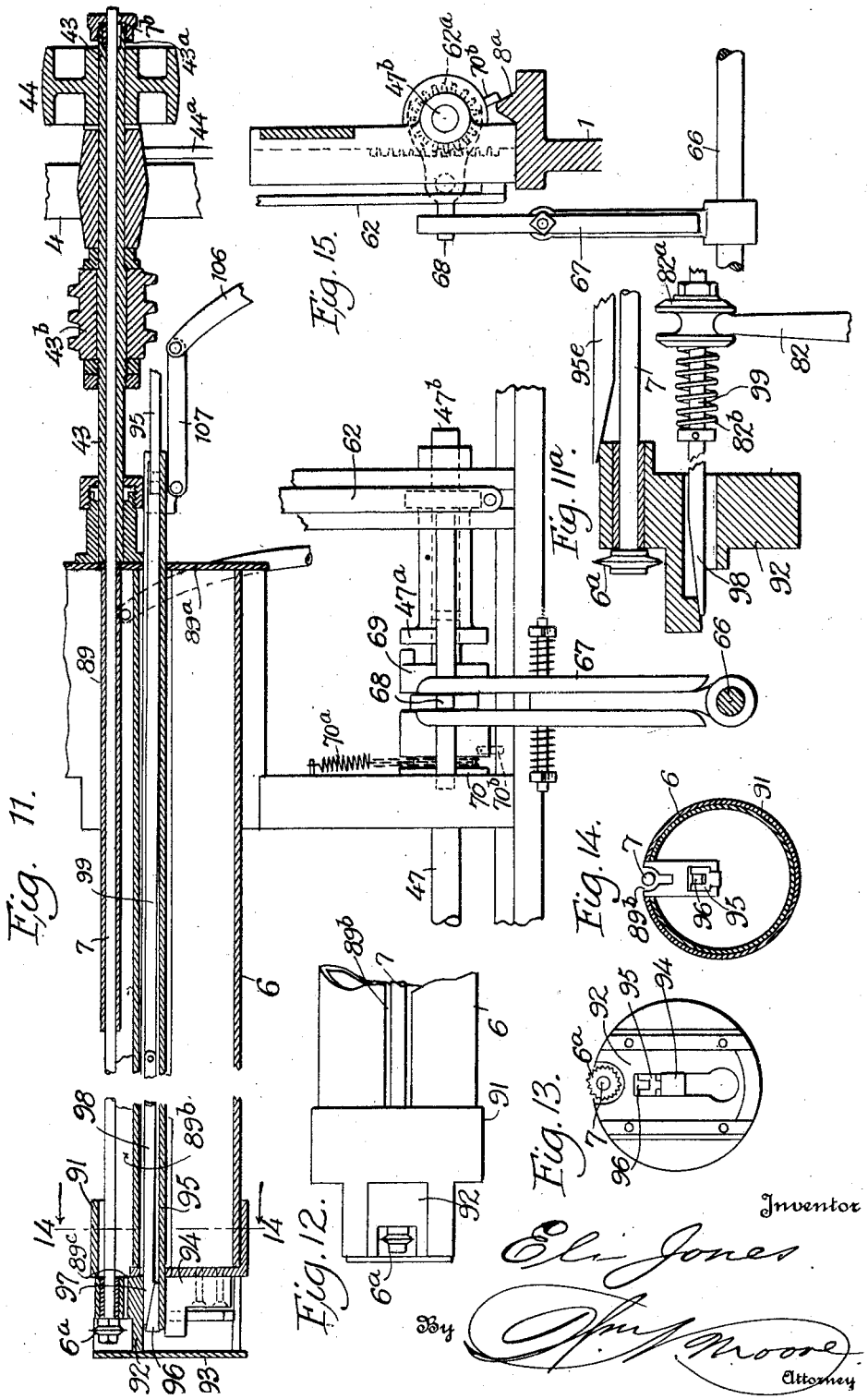

Feb. 5, 1929.
E. JONES
1,701,208
PIPE SLOTTING MACHINE
Filed Jan. 15, 1927
7 Sheets-Sheet 7
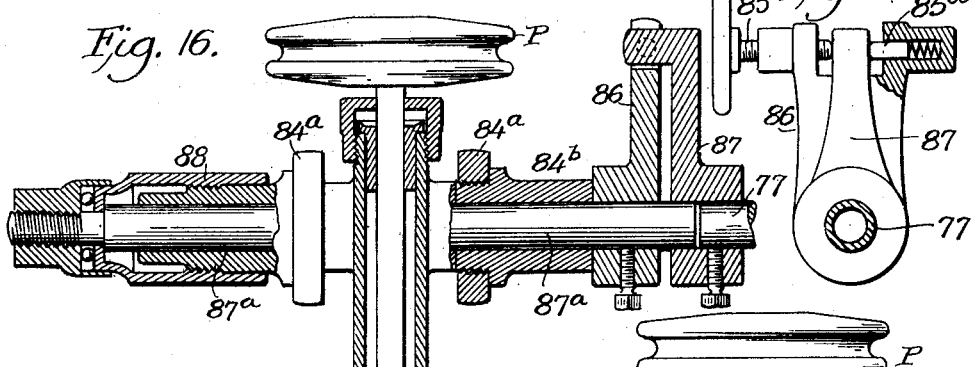
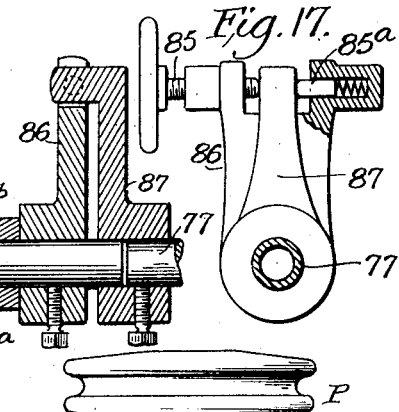
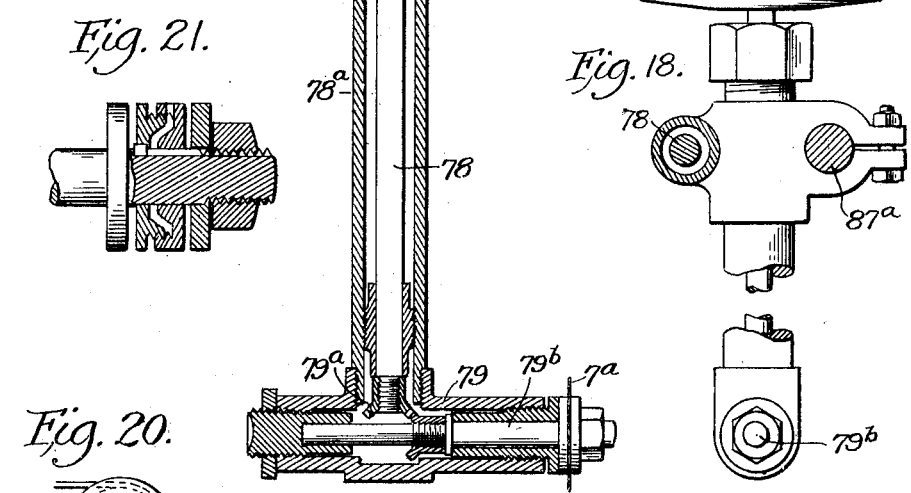
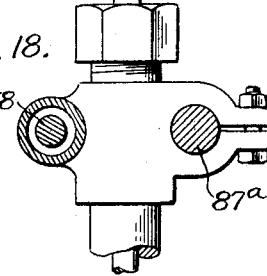
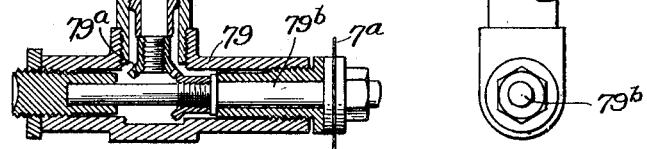
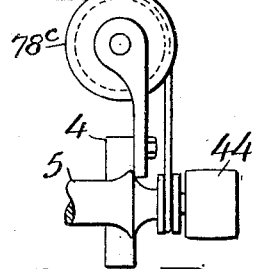
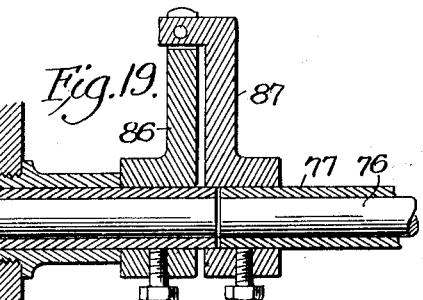
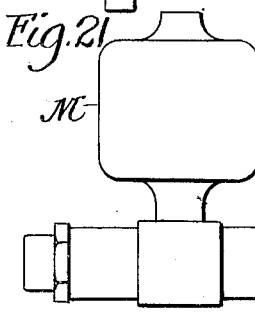
Inventor
Eli Jones.
By
Attorney Patented Feb. 5, 1929.

1,701,208

UNITED STATES PATENT OFFICE.

ELI JONES, OF LEXINGTON, TENNESSEE.

PIPE-SLOTTING MACHINE.

Application filed January 15, 1927. Serial No. 161,363.

This invention relates to pipe tube slotters and more especially to automatic machines for cutting very fine slots at intervals around a pipe to be used in wells and which are adapted to have a liquid, such as water or oil drawn through them, yet prevent the entrance of gravel, sand or dirt into said pipe so that the liquid may be secured with some degree of purity.

The object of this invention is to provide a machine adapted to carry a pipe and intermittently rotate same, subjecting the pipe when at rest to the interior action of a cutter or cutters that forms a groove, and from the exterior of the pipe a very fine saw or saws is used to cut a slot communicating with this, or the interior saws.

The pipe is then partly rotated and another groove or grooves and slot are cut, this operation being repeated until a series of grooves and slots are cut at regular intervals around the body of the pipe. The pipe is then shifted longitudinally while the cutters and saws occupy an inoperative position and work again started to cut another series of annular slots and the shifting and cutting proceed until the desired length of pipe is slotted to form a suitable strainer for the purpose above described.

These and other objects of the invention are more fully described in the following specification, set forth in the appended claims and illustrated in the accompanying drawings, wherein:

Fig. 3 is an enlarged side view of one end of the machine.

Figure 1:
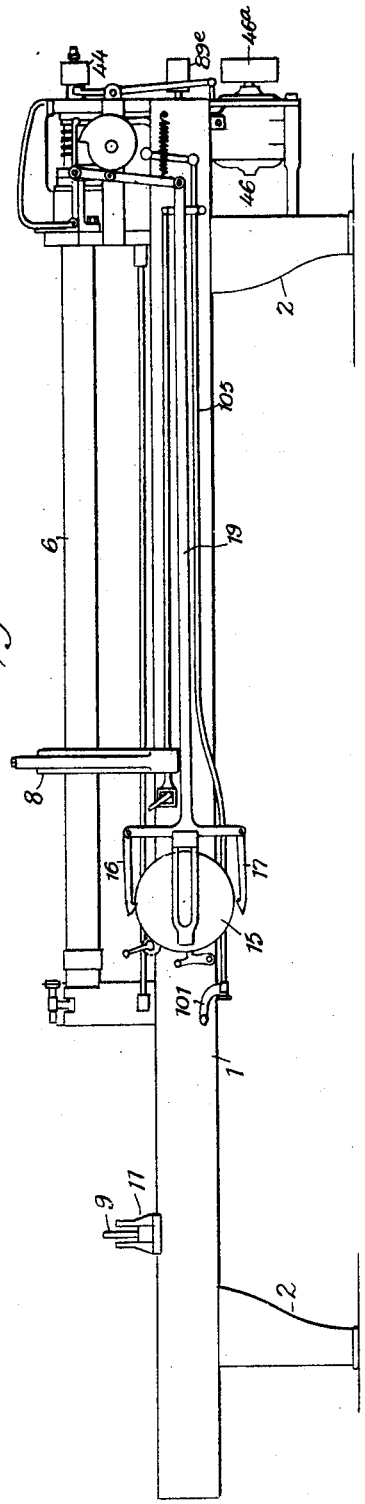
Figure 1 is a side elevation of the improved pipe slotter.

Fig. 3ª is an enlarged detail view of the saw and cutter control.

Fig. 4 is a similar view of the opposite side.

Fig. 5 is a view from the same end of the machine.

Fig. 6 is a view from the opposite end of the machine.

Fig. 7 is an enlarged plan view of the end shown in Figs. 3, 4 and 5.

Fig. 8 is a front elevation of the head that supports and manipulates the pipe.

Fig. 9 is a vertical sectional view through the same.

Fig. 10 is a detail sectional view through the frame of the machine showing part of the mechanism to longitudinally shift the pipe.

Fig. 11 is a longitudinal sectional view through the pipe carrying mandrel with the cutter.

Fig. 11ª is a detail view of the cutter end of the mandrel.

Fig. 12 is a plan view of the cutter end of the mandrel.

Fig. 13 is an end view of said mandrel with end-plate removed.

Fig. 14 is a cross sectional view through the mandrel on the line 14—14 of Fig. 12.

Fig. 15 is a detail side view of part of Fig. 11.

Figs. 16, 17 and 18 are detail views of the saw operating mechanism.

Figs. 19, 20 and 21 are detail views of modified forms of mechanism.

As shown in several views, the bed 1 of the machine is mounted on appropriate legs 2 and has at one end the uprights 3 and 4 with a connecting member 5 comprising a housing for certain mechanism that will be hereinafter described.

Secured in a bearing 5ª of the housing is one end of a mandrel 6, one end of which is to be enveloped by the pipe to be slotted and through which extends the shaft 7 carrying at its outer end the cutter wheel or wheels 6ª to operate on the interior of the pipe.

A movable head 8 travels along the head on tracks 8ª and is provided with a collet or clamping means to secure the pipe and carry it over the mandrel and cutter wheel 6ª and the outer end of the pipe is supported by and moves freely over the rollers 10 in a yoke 9 also supported by rollers 10ª of a frame 11 on the bed 1 at any desired point as shown in Fig. 6.

In Figs. 6, 8 and 9 will be seen a rack bar 12 that is secured to the bottom of head 8 so it may be actuated by the pinion 13 on shaft 14, the latter carrying a toothed disc 15 at the outer side of the bed and that is actuated by one or the other of the pawls 16 or 17, to move the head one way or the other and both or either of these may be thrown out of action by an eccentric 18 with handle at the end of the reciprocating bar 19, the other end of which is connected with an arm 19ª that is oscillated by a cam 19ᵇ.

On the other end of shaft 14 and on the opposite side of the machine is a disc 20 with a pawl 20ª that engages the recesses of a disc 21 to which is secured a pinion 21ª, Figs. 4 and 10, that meshes with a rack bar 22, actuated by levers 24 and 25 at the housing and that are oscillated by the cam 27. When the tooth 28 on bar 22 passes stud 29 on the bed 1 it is caught and there remains until released by lever 31 pivoted at 31ª and attached at its upper end to a sliding bar 30 having stops 23 and 26 that are adapted to be struck by the head 8 and one of the arms of lever 31 caused to raise tooth 28 off of stud 29 when the bar is quickly returned to its original position by the spring 32.

The action on the rack bar 12 above described advances the pipe or tube to be slotted so that another series may be cut annularly and the cutting of the slots around the pipe at a certain point is as follows:

The tube or pipe is rotated by means of a splined shaft 47, best shown in Figs. 3, 4 and 8, carrying a pinion 48 adapted to actuate a sliding rack bar 49 in the head 8 that meshes with a toothed segment 50 on a ring 51 rotating in a second ring 53 having pins 54 on its face, as shown in Figs. 8 and 9.

A lever 55 is pivoted in the head and carries an adjustable sleeve 56 to which is pivoted an arm 57 having a hook 57ª at its upper end. The ring 51 is carried by a slide 52 that is adjusted in head 8 by means of the screw 52ª and lever 55 carries an extension 59 that rides on an angle bar 60 inside the bed and actuated by links 22ᵇ connected to bar 22 on the outside, when it is slid longitudinally by spring 32 and lever 24. This angle bar 60 extends the entire length of travel of head 8 and is raised and lowered by a link 22ᵇ carried by the pin 22ª extending through a slot in the bed and connected to the bar 22, as shown in Figs. 8 and 10.

The cutter 6ª is depressed and the saw 7ª is raised when the pipe or tube is partly rotated to make ready for another longitudinal row of cuts.

The feeding of the pipe against the cutter as it is raised is done by rotating the ring 51 by segment 50, rack 49 and pinion 48 as above explained and the raising of the cutter will be hereinafter described. The rotation of the pipe is controlled by the slot 27ª in cam 27 operating lever 61 with a stud playing in the slot and whose outer end raises line 62 connected to a rack for rotating pinion 62ª on a stud 47ª which is part of a clutch splined on shaft 47 passing through pinion 48 in head 8 as shown in Figs. 11 and 15.

As the rack 49 feeds up, the pipe is rotated the amount needed for a slot and after its completion the cutter is suddenly withdrawn, lever 57 acts, pulling tube back and it is moved longitudinally for a new cut, there being just enough friction between rings 51 and 53 to cause them to move together.

The cam action is to rotate pinion 48 quickly in reverse so as to start a new feed after lever 57 has jerked ring 53 around. Inside the ring 53 is a split ring or collect 53ª which binds the tube or pipe to rotate it and this split ring is changed to suit various sizes of tubes to be cut, down to the limit of a machine, the smallest being a little larger than the size of the mandrel.

If, for any reason, the feed of the pipe against the cutter should be stopped, a lever 63 may be thrown over so that the cam, playing in a box 63' of the rod 64, moves the latter to actuate lever 65 on shaft 66 and a yoke lever 67 engages an arm 68 which moves jaw clutch 69 out of contact with fellow member 47ª on stub shaft 47ᵇ and when this is disengaged no power is given shaft 47 and is fails to turn the pipe operated on. The sliding of clutch 69 to the left permits it to mesh with a semi-stationary disc 70 which is spring controlled to retain member 69 to proper position to mesh again with sleeve 47ª that is secured to pinion 62ª. Spring 70ª and stop 70ᵇ retain member 70 in its normal position.

Figure 2:
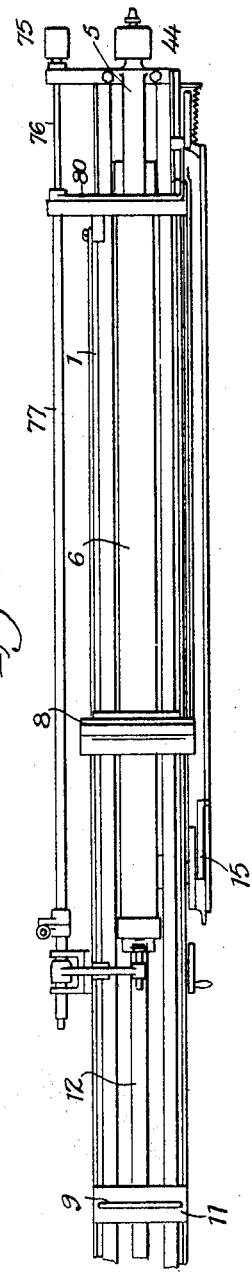
Fig. 2 is a top plan view.

The saw 7ª is actuated by a pulley 75 on its shaft 76 carried in the sleeve 77 as shown in Figs. 2, 16 and 19, the said shaft carrying at its outer end, as shown in the latter view, the bevel gear 76ª meshing with the gear wheel 77ª on a lateral shaft 78 in a cross sleeve 78ª. At the other end of shaft 78 is the beveled gears 79ª in the head 79, one of them on the inner end of the saw arbor 79ᵇ.

Fig. 21 shows how a motor M may be located directly on the head 79 while in Figs. 16, 17 and 18 are shown a modified form of drive for the saw where the shaft 76 does not drive the saw but a pulley P is located at the outer end of shaft 78 and is driven by a belt from a sheave 78ᵇ on the shaft of pulley 44 and more clearly shown in Fig. 20 with the interposed pulley 78ᶜ.

In Figs. 3, 4, 5 and 7 a lever 80 is shown secured at one end to the sleeve 77 while its other end carries the roller 80' acted on by the incline at the end of a slide 81 reciprocated by upright lever 82 which is oscillated by its stud 83 that plays in an eccentric groove in cam 19ᵇ. The elevation of roller 80' and lever 80 turns the sleeve 77 with cross sleeve 78ª and the mechanism shown in Fig. 16 carrying saw 7ª out of operation.

Prior to this operation the cutter 6ª has been inoperative but the slide 81 also thrusts forward, by means of the fork 100, the rod 95 that causes the incline 97 to act on the wedge 96 to raise the cutter and cause it to function.

Arising from the bed of the machine at the end opposite the operating mechanism is a support 84 that carries the outer end of the saw arm 78 that is also rotatable thereon to allow the saw to be depressed to cut its slot or be elevated away from the pipe. A fork 84ª is adapted to carry the bearings 84ᵇ and 84ᶜ for the stub shaft 87ª, as shown in Fig. 16, and its thrust in the latter bearing is regulated by the nut 88.

The stub shaft 87ª may be adjusted with relation to shaft 76 by means of the arms 86 and 87 respectively with the screw 85 and spring plunger 85ª, as shown in Figs. 16 and 17, one arm being carried by each member 76 and 87ª.

When it is desired to change the cutter on shaft 7 and remove the securing nut a lever 44ª with a fork at its upper end is caused to lock by friction or teeth into pulley 44 by means of a rod 44ᵇ connected to a lever 44ᶜ near the middle of the bed and shown in Figs. 3 and 5. When the lever 44ᶜ is released a spring 44ᵈ causes the said lever 44ª to release the pulley.

The pulley 44 is carried at the outer end of a sleeve 43 in which the shaft 7 is carried and the two are secured together by a split conical thimble 43ª forced inward by the nut 7ª, as shown in Figs. 11 to 14, and the shaft 7 within the mandrel 6 revolves in a tube 89 which is brazed into a guide-bar 89ª and the shaft 7 is left exposed and free near the outer end of the mandrel for the raising and lowering of same.

A passage way 89ᵇ (Fig. 14) under the tube 89 permits the lubricant to be pumped through to the cutter and to carry off the chips, the oil finally flows back to the tank 89ᶜ (Figs. 1 and 4) where it is strained.

On the head 91 of the mandrel 6 is a vertically sliding block 92 containing the outer bearing of the cutter shaft 7, the block being retained in place by a plate 93, shown in Fig. 11, but omitted from Fig. 13, and a passage 89ᶜ is provided through the block 92 for oil.

Secured in the head 91 is a support 94 on which slides a channel bar 95 on the upper face of which is attached a wedge 96 on which rides the bevelled end 97 of a hinged section 98 of the sliding bar 99 whose opposite end is turned outward to be engaged by a fork 100 which is a part of the sliding bar on whose outer end is the incline 81 at the operating mechanism.

The raising of the saw and the retraction of the bevelled end 97 are thus done at the same time and the cutter is lowered, permitting the pipe to be rotated between the operation of these tools and set ahead for the next cut. For another operation the cutter is raised to cut a new groove, then the saw is dropped over the last made groove to cut the slot.

The cutter 6ª may also be made inoperative by means of a lever 101 pivoted to the bed at one side as shown in Fig. 3 and to which is loosely secured a swivel block 102 through which passes the hand screw 103 with hand wheel 104 to adjust it with relation to the rod 105 extending towards the operative end of machine where it is connected with the lower end of a lever 106 whose upper end, as shown in Fig. 11 is attached to the link 107 that is attached to and shifts channel bar 95, with its wedge 96, to the left and out of range of bar 97, thereby stopping the vertical motion or bringing sliding block 92 at rest.

As will be most clearly shown in Figs. 3 and 5, power is supplied to the machine by a motor 46 whose pulley 46ª drives a belt 45 also passing around the pulleys 44 and 75 and the pulley 89ᶜ of the pump 89ᵈ. The worm 43ᵇ on sleeve 43 drives worm wheel 19ᶜ on the shaft of cam 19ᵇ.

In Fig. 11ª is shown a modified way for shifting the cutter and where the channel bar 95 of Fig. 11 is dispensed with. The block 92 is still employed and is elevated by the wedge-shaped bar 98 and depressed by a wedge-shaped bar 95ᵉ. The bar 95ᵉ is actuated by link 107 and lever 106 while the bar 98 is reciprocated by lever having a collar 82ª and compressible spring 82ᵇ to ease the action of the parts.

This construction makes the movement of the cutter positive and it need not depend upon gravity to remove it from the pipe.

The dotted line at the end of slide 81 in Fig. 3ª indicates that the incline for roller 80' may be reversed so that the movement of the cutter with relation to the movement of the saw may be changed to an alternative instead of coincident action.

It is obvious that other modifications and alterations of the parts may be resorted to without departing from the essential features above described or from the scope of the appended claims.

What I claim as new is:

1. In a pipe slotting machine, the combination of carrying means for a pipe, means for axially rotating the pipe back and forth, means for operating a cutter wheel on one surface of said pipe during the rotation in one direction, and means for operating a saw on the opposite surface of said pipe during its rotation in the opposite direction.

2. In a pipe slotting machine, the combination of supporting means for a pipe, means for oscillating the pipe, a cutter wheel adapted to operate within the pipe during its movement in one direction, a saw adapted to operate on the outer side of the pipe during its movement in the opposite direction, means for rendering the cutter wheel inoperative when the saw is operative and vice versa, means for removing both the cutter and the saw from the pipe, and means for shifting the pipe lengthwise when the cutter wheel and saw are both inoperative.

3. In a pipe slotting machine, the combination of a movable head, means for carrying a pipe in the head, means for rotating the pipe in relatively opposite directions in the head, means for cutting a groove in the interior of the pipe during its rotation in one direction, and means for sawing a slot along the groove during rotation of the pipe in the opposite direction.

4. In a pipe slotting machine, the combination of a head for carrying a pipe, means for moving the head to carry the pipe longitudinally, means for rotating the pipe in relatively opposite directions in the head, a cutter wheel adapted to operate in the pipe to cut grooves during rotation of the pipe in one direction, a saw adapted to operate on the outer side of the pipe to cut slots at the grooves during rotation of the pipe in the opposite direction, means for relieving the saw from its operation while the cutter is in operation, and means for rendering the cutter wheel and saw inoperative while the pipe is moving lengthwise.

5. In a pipe slotting machine, the combination of a travelling head, means for carrying and oscillating a pipe in the head, a mandrel adapted to pass through the head and be enclosed in the pipe, a cutter wheel carried by the mandrel and adapted to groove the interior of the pipe during its movement in one direction, and a saw adapted to cut a slot conforming with the groove during movement of the pipe in the opposite direction.

6. In a pipe slotting machine, the combination of a bed carrying a travelling head, rotating means in the head adapted to carry a pipe, means for intermittently oscillating the rotating and carrying means, means for moving the head longitudinally of the pipe after each complete oscillation, means for grooving the interior of the pipe while at rest longitudinally and during oscillation in one direction, and means for sawing slots in the pipe while it is at rest longitudinally and during oscillation in the opposite direction.

7. In a pipe slotting machine, the combination of a bed having tracks, a head adapted to travel on the tracks, a rotating carrier for a pipe in the head, a mandrel extending through the head and carrier, means for moving the head over the tracks, means for oscillating the carrier in the head, means for grooving the pipe on the inside during its oscillation in one direction, and means for slotting the grooves from the outside as it oscillates in the opposite direction.

8. In a pipe slotting machine, a longitudinally movable pipe support, means to partially rotate a pipe in relatively opposite directions in said support between longitudinal movements thereof, an interior cutter, an exterior saw, and means to successively bring said cutter and saw into action during successive rotative movements of the pipe support.

9. In a pipe slotting machine, a longitudinally movable pipe support, means to partially rotate a pipe in relatively opposite directions in said support between longitudinal movements thereof, an interior cutter, an exterior saw, means to successively bring said cutter and saw into action during successive rotative movements of the pipe support, and means to move the pipe support longitudinally after each action of the cutting and sawing means.

10. In a pipe slotting machine, a longitudinally movable pipe support, means to partially rotate a pipe in relatively opposite directions in said support between longitudinal movements thereof, an interior cutter, an exterior saw, means to successively bring said cutter and saw into action during successive rotative movements of the pipe support, means to move the pipe support longitudinally after each action of the cutting and sawing means, means to periodically reverse the longitudinal movement of the support, and means to periodically rotate a pipe in one direction while both the cutter and saw are inactive.

11. In a pipe slotting machine, pipe supporting means including a mandrel having a liquid channel therein, pipe cutting means supported in said mandrel including a cutter adjacent to one end of the liquid channel, and means for supplying a cooling, cleaning and lubricating liquid to said channel, including a supply pipe and a pump for forcing liquid through said supply pipe.

12. In a pipe slotting machine, a longitudinally movable pipe support, a pipe holding mandrel rotatable in said support, having pipe cutting means and a liquid feed channel leading to said cutting means, means to partially rotate a pipe on said mandrel, means for forcing a liquid through said channel, a saw opposed to the cutter, means to successively bring the cutter and saw into action upon rotation of the pipe in opposite directions, and means to move the pipe support longitudinally after successive actions of the cutting and sawing means.

In testimony whereof I hereunto affix my signature.

ELI JONES.